US012764104B2

(12) United States Patent
Rajeevalochanam et al.

(10) Patent No.: US 12,764,104 B2
(45) Date of Patent: Oct. 13, 2026

(54) SINGLE SIGN-ON BROKER

(71) Applicant: HEWLETT PACKARD ENTERPRISE DEVELOPMENT LP, Spring, TX (US)

(72) Inventors: Tejaswi Bangalore Rajeevalochanam, Bangalore (IN); Sonu Sudhakaran, Bangalore (IN); Sathya Shankar K A, Bangalore (IN); Manjunath Patil, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 10 days.

(21) Appl. No.: 19/071,489

(22) Filed: Mar. 5, 2025

(65) Prior Publication Data

US 2026/0156106 A1 Jun. 4, 2026

(30) Foreign Application Priority Data

Dec. 4, 2024 (IN) ............................ 202441095901

(51) Int. Cl.
*H04L 9/40* (2022.01)

(52) U.S. Cl.
CPC ........ *H04L 63/0815* (2013.01); *H04L 63/105* (2013.01)

(58) Field of Classification Search
CPC .......................... H04L 63/0815; H04L 63/105
See application file for complete search history.

(56) References Cited

U.S. PATENT DOCUMENTS

| | | | | |
|---|---|---|---|---|
| 12,541,726 | B1 * | 2/2026 | Kunchakarra | G06Q 10/0631 |
| 2014/0114873 | A1 * | 4/2014 | Contacos | G06Q 10/105 705/322 |
| 2021/0306322 | A1 * | 9/2021 | Suraparaju | H04L 63/0861 |
| 2025/0112905 | A1 * | 4/2025 | Redberg | H04L 63/101 |
| 2025/0373670 | A1 * | 12/2025 | Ough | H04L 63/105 |
| 2026/0030375 | A1 * | 1/2026 | Shpilyuck | G06F 21/6218 |
| 2026/0122053 | A1 * | 4/2026 | Smalser | H04L 63/083 |

* cited by examiner

*Primary Examiner* — Sangseok Park
(74) *Attorney, Agent, or Firm* — Hewlett Packard Enterprise Patent Department

(57) ABSTRACT

In certain examples, a method includes obtaining, at a single sign-on (SSO) broker, an identity event associated with a user of a private cloud; requesting, by the SSO broker and in response to obtaining the identity event, a user information set corresponding to the user from a private cloud platform corresponding to the private cloud; providing the user information set to an identity access management (IAM) tool of the SSO broker; and updating a realm of the IAM tool to reflect the identity event based on the user information set.

17 Claims, 5 Drawing Sheets

SINGLE SIGN-ON BROKER

BACKGROUND

Computing resources (e.g., hardware resources, software resources) may be deployed as part of a cloud environment. Access to resources in a cloud environment is often subjected to at least some form of access control, through which users may be authenticated, and authenticated users may be authorized to access at least some portion of the computing resources in the cloud environment.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims. Aspects of the present disclosure are best understood from the following detailed description when read with the accompanying figures. For a more complete understanding of this disclosure, and advantages thereof, reference is now made to the following descriptions taken in conjunction with the accompanying drawings, in which:

Figure 1:
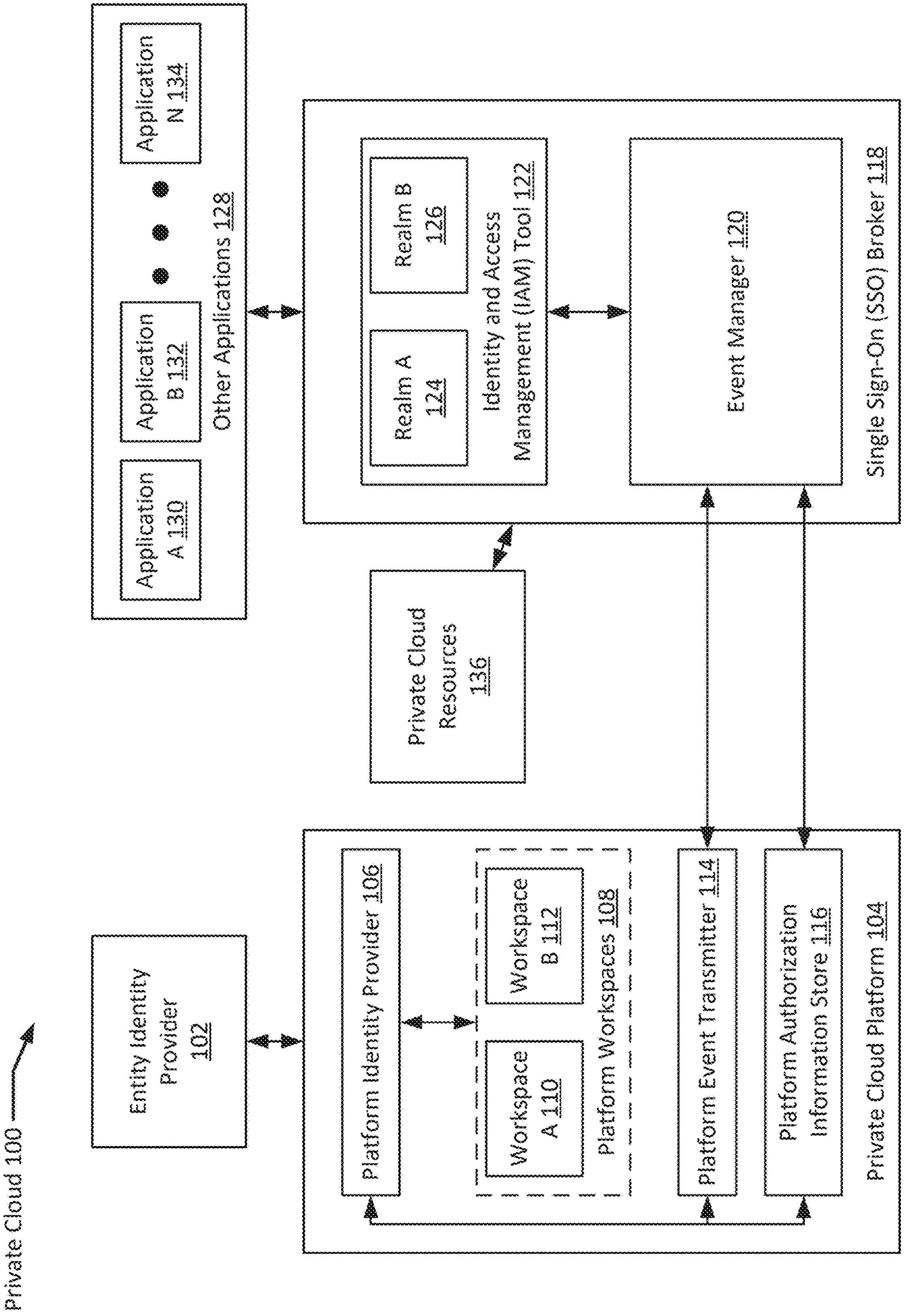
FIG. 1 shows a block diagram of a private cloud in accordance with one or more examples disclosed herein.

The figures are drawn to illustrate various aspects of the disclosure and are not necessarily drawn to scale.

DESCRIPTION

The following disclosure provides many different examples for implementing different features. Specific examples of components and arrangements are described below to simplify the present disclosure. These are, of course, merely examples and are not intended to be limiting.

Entities may seek an environment of computing resources for performing various tasks, operations, activities, and the like, and/or in which various applications, services, and the like may be operated and/or provided. Such an environment may be referred to as a cloud environment. Resources in a cloud environment may be obtained, for example, from a cloud services provider, which may provide hardware resources, software resources, management services, and/or any other relevant components and/or services to be deployed as the cloud environment. In some circumstances, such entities may seek to retain at least some degree of control over such an environment by having at least some control of the physical computing resources (e.g., computing devices, network devices, storage devices, management devices, and the like) and/or logical resources (e.g., software, applications, services, container platforms, management techniques, and the like) of the cloud environment. An environment in which such an entity maintains such control may be referred to as a private cloud. In one or more examples, a private cloud is an environment in which all or any portion of physical and/or logical computing resources of the cloud environment are managed, used, or otherwise maintained by a particular entity (e.g., a company) or set of entities and are intended for the use of the entity or set of entities that maintain the private cloud.

As an example, a particular entity may seek and acquire physical components (e.g., computing devices, networking equipment, storage devices, infrastructure components), and other components, such as management software, applications, services, other software, and the like from a provider of such resources, and deploy the resources at one or more physical sites as a private cloud, in which other applications and/or services (e.g., applications and/or services from third party providers) may also be deployed. A private cloud may include external network connections (e.g., a connection to the Internet) through which a connection to an external entity, referred to herein as a cloud services provider or private cloud provider, may exist, and through which the private cloud provider may provide private cloud services such as management services, software updates, software lifecycle management services, device lifecycle management services, health monitoring, and the like. In other scenarios, a private cloud may be a disconnected private cloud, where the computing resources maintained by the entity exist at one or more physical locations, and are not connected to an external network, such as the Internet.

In one or more examples, to facilitate use of a private cloud, a private cloud provider may provide a private cloud platform, through which administrators and users of the private cloud may manage, use, and/or otherwise interact with various resources of the private cloud. In one or more examples, a private cloud platform may use techniques for authentication and authorization of users and other entities to use the resources therein. As an example, users of resources in a private cloud may require access to and/or authorization for using services provided by a private cloud provider as part of the private cloud platform (e.g., access to and/or use of a virtual machine as-a-service (VMaaS) service, a bare metal as-a-service (BMaaS) service, and the like), and may also require access and/or authorization to use other applications, services, and the like (e.g., which may be provided via third parties) deployed within the private cloud.

In such a scenario, the entity may set up services and processes for controlling access to resources of the private cloud, such as deploying an entity identity management provider, which may authenticate users, and authorize such users to use various resources within one or more domains. As an example, an entity may maintain any number of Active Directory (AD) domains, which may serve to authenticate users and provide authorization for such users to use resources of the one or more domains. In such a scenario, the entity may further use a federated identity service, such as AD Federated Services (ADFS) to provide users with a single sign-on service, by which a user signs in once (e.g., using a username and password, or other sign in criteria), and is issued a token that includes various items of information that, when shared with other devices, services, and the like, allows the user to use additional computing resources without requiring additional sign in.

In certain scenarios, users may be provided access to any portion of the computing resources of a private cloud of an entity, such as various services, applications, files, other information, and the like. An authenticated user may be granted access to such resources individually. Additionally, or alternatively, an authenticated user may be provided access to a subset of the computing resources of a private cloud. As an example, computing resources of a private cloud may be divided into different workspaces, which may also be referred to as tenants (e.g., a bounded context of computing resources within which an authenticated user is authorized to operate), and a user may be provided access to the workspace (e.g., be part of a tenant) in order to have access to the computing resources therein.

Additionally, a particular user may be assigned one or more roles. In one or more examples, assignment of a role to a user may control, at least in part, the portion of computing resources of a private cloud to which the user has access. A given user may be provided access to any number of workspaces, and/or may be assigned to any number of roles for accessing computing resources within an ecosystem of such resources (e.g., a private cloud). Additionally, any number of services and/or applications may be deployed in a private cloud, and a given workspace/tenant, and/or a particular role, may be associated with certain of the services and/or applications, so that users who are provided access to the workspace/tenant, or assigned to the role may access the corresponding set of services and applications.

However, challenges exist for facilitating single sign-on access for users in a private cloud environment. As an example, a cloud provider may provide a platform (referred to herein as a private cloud platform) through which users access and/or use various services of the private cloud, such as VMaaS and BMaaS services. At the same time, the private cloud may be configured with any number of applications, from a private cloud provider and/or any number of third-party providers, to which users may also need access. Such services from the provider of the private cloud and from other entities may not use identity authentication and authorization services that are configured to function properly with one another. Examples disclosed herein address such problems by implementing a single sign-on (SSO) broker for managing, at least in part, authentication and authorization of users for using resources within a private cloud, including provider services such as VMaaS and BMaaS, and third party services, such as various other applications deployed within the private cloud. In one or more examples, such an SSO broker may bridge the SSO functionality between proprietary SSO functionality implemented by a private cloud provider, and standard protocol-based SSO functionality (e.g., Security Assertion Markup Language (SAML), OpenID Connect (OIDC)) implemented by entities that maintain a private cloud and/or third-party applications deployed within the private cloud.

In one or more examples, a private cloud platform is configured to include a platform identity provider for the private cloud platform (e.g., PingFederate), which may include and/or be associated with a user interface (UI) for providing and managing SSO access for users, configuring roles for users (e.g., a role modification), configuring workspaces/tenants, and the like.

The platform identity provider may be configured, at least initially, to trust an existing identity provider (e.g., AD and/or ADFS) maintained by the entity for which the private cloud is provided, and thus may be configured to match the users, roles, and tenants set up by the entity using such an entity identity provider. The platform identity provider may be configured, for example, to interact with the entity identity provider using industry standard standards and protocols, such as SAML, or OIDC. As an example, a platform identity provider may be configured to create workspaces and/or roles within the private cloud platform to mirror the tenants and/or roles configured in the entity identity provider, and to accept (e.g., trust) user authentication from the entity identity provider (e.g., PingFederate within the private cloud platform may be configured to trust AD and/or ADFS maintained by the entity associated with the private cloud).

In one or more examples, the private cloud platform may include and/or be operatively connected to an SSO broker configured for the private cloud. In one or more examples, an SSO broker facilitates single sign-on access to the various resources of a private cloud. As an example, a private cloud provider may configure an SSO broker for providing and managing SSO functionality for user access to various resources, services, and/or third party applications within a private cloud. In one or more examples, the SSO broker is configured to interact with the private cloud platform, and with various third-party applications, in order to facilitate the SSO access for users to resources (e.g., services of the private cloud provider, third party applications, and the like) within the private cloud. To that end, the SSO broker may be configured with an identity and access management (IAM) tool (e.g., Keycloak), which serves as a bridge between workspaces/tenants configured for a private cloud (e.g., sets of hardware and/or software resources), services offered by the private cloud provider (e.g., VMaaS, BMaaS, private cloud monitoring services, and the like), and corresponding constructs of the third-party applications.

As such, the IAM tool of the SSO broker may be configured with any number of realms, which are logical constructs that correspond to workspaces of the private cloud platform. For example, a platform identity provider of a private cloud platform may configure three workspaces that correspond to three tenants configured in an entity identity provider, and the IAM tool of the SSO broker may have three realms configured that correspond to the three workspaces. Such realms may be configured to allow users access to the compute resources of the workspaces/tenants associated with a given realm and to services and applications also associated with the realm. A particular realm may have constructs, referred to as groups, which directly correspond to roles configured for users. Thus, users assigned to a particular role may be correspondingly added to a particular group associated with the role within a realm of an IAM tool of an SSO broker.

In one or more examples, access management provided by the SSO broker is driven, at least in part, by identity events. In one or more examples, an identity event is any change to access rights for users within a private cloud. Examples of such identity events include, but are not limited to, adding a user, assigning a user to a workspace/tenant, removing a user, assigning a user to one or more roles, removing a user from one or more roles, providing or removing access for a user or role to one or more applications, creating a new workspace, deleting a workspace, creating new roles, deleting roles, and the like. Such events may be actuated, for example, by an administrator via a user interface (UI) of the private cloud platform, or by an administrator of the entity for which the private cloud is provided using an identity provider maintained by the entity (e.g., AD and/or ADFS).

In one or more examples, when any identity event occurs, a notification of the event is provided from the private cloud platform to the SSO broker. The notification may include any amount of information about the event. In one or more examples, the notification contains a limited amount of information, such as an identification of the user, identification of the one or more workspaces to which the event is related, and the fact that some unspecified event has occurred related to the user. The identify event notification may be received, for example, at the SSO broker (e.g., via an event handler subscribed to receive notification of such events). The SSO broker may then extract relevant information from the event (e.g., the user identity, the one or more workspaces), and send a request to the private cloud platform for information related to the user, including, for example, roles, permissions, accessible workspaces, and the like that are associated with the user (e.g., user access rights). In one or more examples, once such information is obtained from the private cloud platform, the information is provided to the IAM tool of the SSO broker, which then updates one or more realms of the IAM tool to reflect whatever change triggered the identity event (e.g., user given access to third-party application, user added to workspace, user removed from workspace, and the like).

In one or more examples, the realms created within the IAM tool (e.g., Keycloak) of the SSO broker directly correspond to tenants created within an entity identity provider (e.g., AD and/or ADFS) and corresponding workspaces created within a private cloud platform identity provider (e.g., PingFederate). In one or more examples, the IAM tool of the SSO broker is configured to trust the private cloud platform identity provider (which may, in turn, be configured to trust the entity identity provider), and to configure the realms of the IAM tool to allow SSO access to resources for users.

In one or more examples, the realms are also configured to allow access to other applications using industry standard techniques (e.g., SAML) by maintaining application identity management instances (e.g., SAML application instances) within the realms for the corresponding applications, thereby bridging SSO access from the private cloud platform identity provider to third party applications, as the application identity management instances may be configured to trust the IAM tool to allow SSO access to corresponding applications. In one or more examples, using IAM tool realms within an SSO broker may allow for SSO access for users to access both services provided by a platform cloud provider (e.g., VMaaS, BMaaS, and the like), and other applications (e.g., third party applications) deployed within a private cloud environment.

FIG. 1 shows a block diagram of a private cloud 100 in accordance with one or more examples disclosed herein. As shown in FIG. 1, the private cloud 100 includes an entity identity provider 102, a private cloud platform 104, a platform identity provider 106, platform workspaces 108 (including a workspace A 110 and a workspace B 112), a platform event transmitter 114, a platform authorization information store 116, a single sign-on (SSO) broker 118, an event manager 120, an identity and access management (IAM) tool (which includes a realm A 124 and a realm B 126), other applications 128 (which include application A 130, application B 132, and application N 134), and private cloud resources 136. Each of these components is described below.

In one or more examples, the private cloud 100 is a cloud environment deployed for and use by one entity or a particular set of entities. In one or more examples, a cloud environment is a collection of compute resources (e.g., computing devices, network devices, storage devices, various types of software, and the like). As an example, a particular entity, such as a company, may seek to have a cloud environment that employees of the company use for various purposes and/or through which the company provides various services to users.

A private cloud (e.g., the private cloud 100) may be configured to provide computing resources on-demand to users of the private cloud. To that end, an entity for which the private cloud 100 is deployed may obtain a private cloud platform (e.g., the private cloud platform 104, discussed further below), which may include a user interface (e.g., a web-based graphical user interface (UI)), which users of the entity may interact with to obtain access to the computing resources of the private cloud.

In one or more examples, an entity for which the private cloud 100 is deployed may desire to secure the private cloud 100 by implementing systems and techniques for authentication (e.g., of user identity) and authorization (e.g., for users to access or otherwise use resources of the private cloud 100). In some scenarios, the entity may configure an entity identity provider (e.g., the entity identity provider 102). In one or more examples, the entity identity provider 102 is a system, maintained by an entity, for authenticating users of the private cloud 100, and/or providing authorization for such users to access or use resources within the private cloud.

Figure 4:
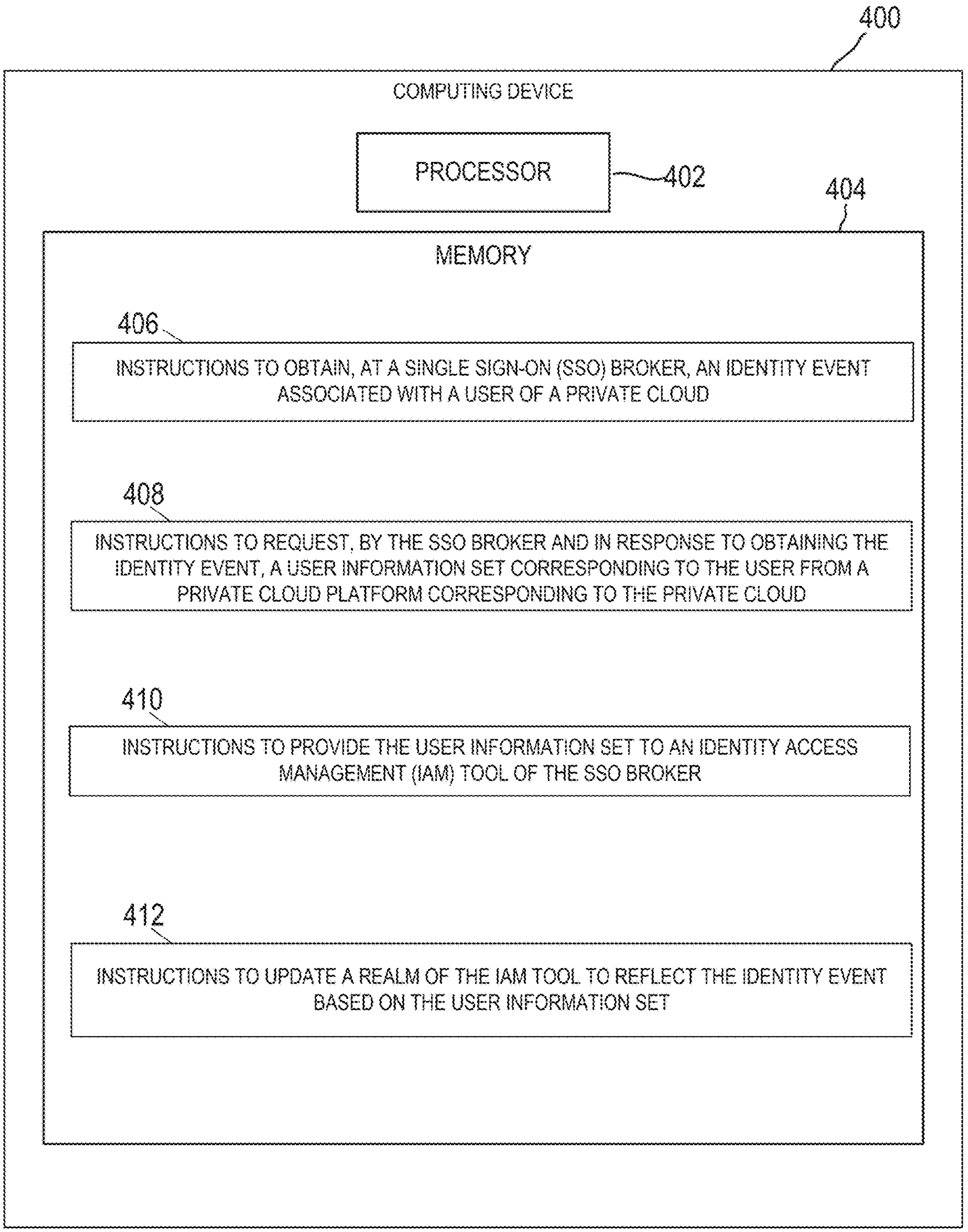
FIG. 4 illustrates a block diagram of a computing device, in accordance with one or more examples disclosed herein.
Figure 5:
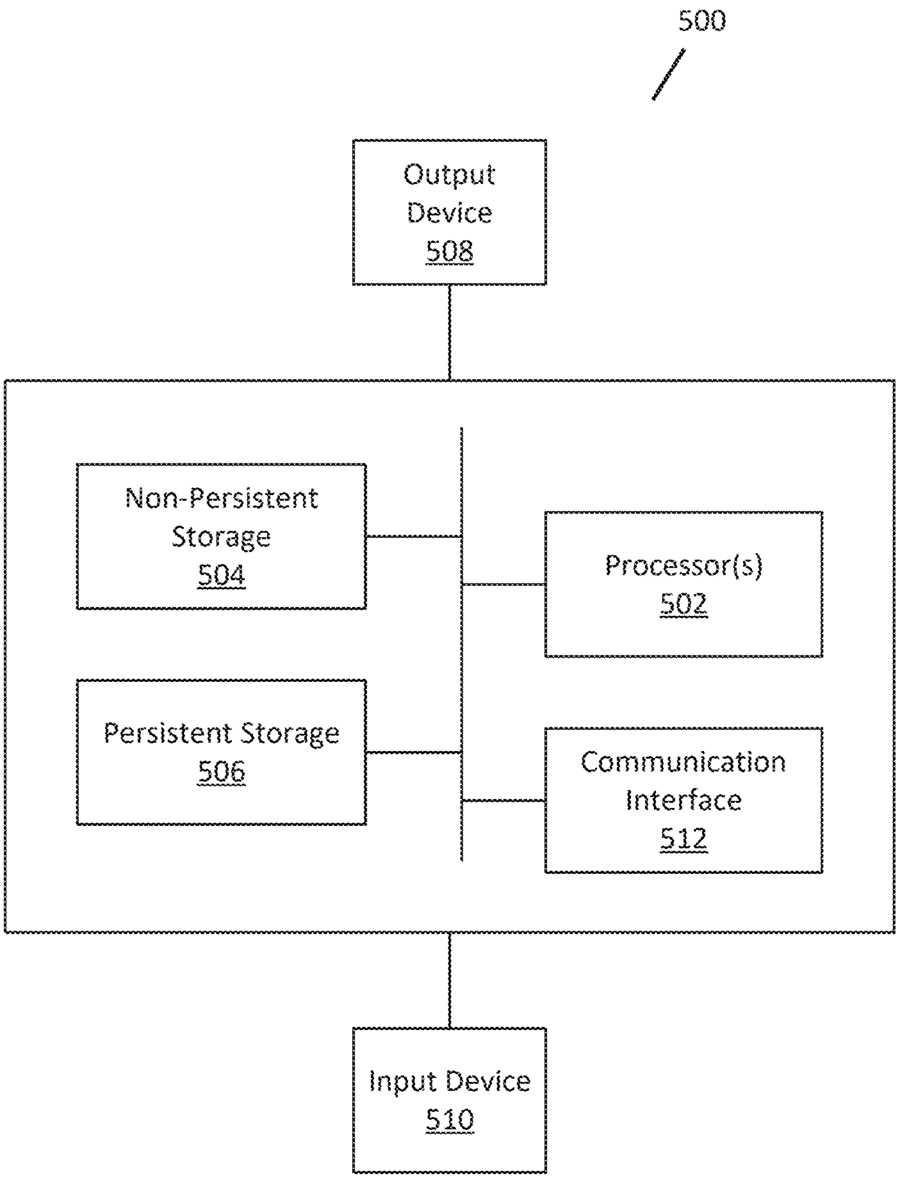
FIG. 5 illustrates a block diagram of a computing device, in accordance with one or more examples disclosed herein.

In one or more examples, the entity identity provider 102 is implemented using one or more computing devices. In one or more examples, as used herein, a computing device may be any single computing device, a set of computing devices, a portion of one or more computing devices, or any other physical, virtual, and/or logical grouping of computing resources. Non-limiting examples of a computing device are shown in FIG. 4 and FIG. 5, which are described below. In one or more examples, a computing device may be any device of any type that is configured to host all or any portion of one or more applications, microservices, clustered environment services, storage services, network services, and/or any other computing function, which may include executing instructions, performing operations, executing functions, performing computations, and the like.

In one or more examples, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components, and/or any combination thereof.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device, a virtual machine, a virtualized computing environment, a logical container (e.g., for one or more applications), a container pod, an Internet of Things (IoT) device, an array of nodes of computing resources, a supercomputing device, a data center or any portion thereof, any combination of the aforementioned items, and/or any other type of computing device. As one of ordinary skill in the art will appreciate, any of the aforementioned examples of computing devices necessarily require at least some hardware components. As an example, a virtual machine, a container, and/or a container pod, when considered as a computing device herein, include the underlying hardware on which the virtual machine, container, and/or a container pod executes.

In one or more examples, the storage and/or memory of a computing device or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more examples, any storage and/or memory of a computing device or system of computing devices may be considered, in whole or in part, as non-transitory computer readable mediums storing software and/or firmware, which, when executed by one or more processors, cause the one or more processors to perform operations (e.g., execution of one or more computer programs) in accordance with one or more examples disclosed herein.

As an example, the entity identity provider 102 may be an instance of Active Directory (AD) and/or AD Federation Services (ADFS), in which one or more domains are configured, users may be authenticated (e.g., via a username/password combination and/or any other authentication technique(s)), users may be assigned to be part of one or more tenants, users may be assigned roles, and the like. Other examples of an identity provider may be used as the entity identity provider 102 without departing from the scope of examples disclosed herein.

Regardless of the identity provider solution used as the entity identity provider 102, the entity identity provider 102 may be configured with constructs such as users, tenants, and roles. A user may be any entity (e.g., employee, customer, end-user, software entity, and the like) configured within the entity identity provider 102 with an identity that can be authenticated using any authentication technique(s). A user may be any entity (e.g., human user, software entity, and the like) that is provided access to resources of the private cloud 100, and that is capable of providing information of any type that allows the identity of the user to be authenticated. A tenant may be, for example, a group of users, departments, sub-entities, and the like within an entity for which the private cloud 100 is deployed, and which have access to a common set of resources of the private cloud 100. A role may be a set of permissions, access rights, and the like, where any user assigned to the role has access to a common portion of the resources of the private cloud 100. In one or more examples, any addition of a role, deletion of a role, or change to a role may be referred to as a role modification.

In one or more examples, the entity identity provider 102 may be configured, at least in part, to provide single sign-on (SSO) functionality for users, whereby a user may be authenticated once, and then have access to any resources of the private cloud 100 for which the user is authorized. As an example, a token (or any other similar item of information) may be generated for a user authenticated by the entity identity provider 102, which may be provided to other components within the private cloud (e.g., via a browser) for authenticating and authorizing a user as the user navigates to various locations to access and use resources of the private cloud 100.

In one or more examples, the private cloud 100 includes the private cloud platform 104. In one or more examples, the private cloud platform is a computing device (discussed above) that is configured, at least in part, to provide a UI through which users, administrators, and the like of the private cloud 100 may interact with the private cloud 100.

In one or more examples, the private cloud platform 104 is configured to manage, at least in part, access to resources of the private cloud 100. To that end, in one or more examples, the private cloud platform includes the platform identity provider 106. In one or more examples, the platform identity provider 106 is implemented using a computing device (discussed above). In one or more examples, the platform identity provider is configured to provide SSO access to resources of the private cloud 100. One example of the platform identity provider 106 is PingFederate. Other examples of platform identity providers may be used without departing from the scope of examples disclosed herein. In one or more examples, the platform identity provider 106 is configured to trust the entity identity provider 102, which may mean that the platform identity provider is configured to trust the authentication of users by the entity identity provider, and to set up constructs that match, at least in part, constructs configured by the entity identity provider 102, such as the roles and tenants of the entity identity provider 102.

As an example, in regards to user authentication, a user may access the entity identity provider to provide authentication information (e.g., log in using a user name and password, biometric information, and the like). When a user is successfully authenticated, the entity identity provider 102 may provide information (e.g., a token) to the platform identity provider 106, which validates the authentication information, and, thus, the user, as an authenticated user for the private cloud 100.

In one or more examples, the platform identity provider 106 may include one or more workspaces (e.g., the workspace A 110, the workspace B 112). In one or more examples, a workspace of the private cloud platform 104 is configured to match, at least in part, any similar construct (e.g., a tenant) of the entity identity provider 102. In one or more examples, a workspace (e.g., the workspace A 110, the workspace B 112) is a bounded context of computing resources of the private cloud 100 within which an authenticated user is authorized to operate. A set of workspaces (e.g., the workspace A 110, the workspace B 112) may collectively be referred to as the platform workspaces 108. Although FIG. 1 shows an example that includes two platform workspaces 108, the private cloud platform 104 may include any number of platform workspaces 108 without departing from the scope of examples disclosed herein.

In one or more examples, the platform identity provider 106 may further configure roles, which may match, at least in part, the roles defined within the entity identity provider 102. Thus, roles within the entity identity provider 102 may be imported into the platform identity provider 106 to allow users assigned to the roles to access the resources of the private cloud 100 associated with the role.

In addition to, or alternative to, the platform identity provider 106 mirroring the users, roles, and tenants of the entity identity provider 102, the platform identity provider 106 may also separately configure workspaces within the private cloud 100, define roles (e.g., perform role modifications) for users of the private cloud 100, and/or add additional users not comprehended by the entity identity provider 102 without departing from the scope of examples disclosed herein. As an example, an administrator of the private cloud 100 may use the private cloud platform 104 to configure additional users, roles, and/or workspaces within the platform identity provider 106.

In one or more examples, the private cloud platform 104 includes the platform authorization information store 116. In one or more examples, the platform authorization information store 116 is one or more data constructs of any type that includes information about users, roles, workspaces, and the like. As an example, the platform authorization information store 116 may include a data structure that includes identified users, and the corresponding roles, permissions, user access rights, and computing resources of the private cloud 100 associated with such users. In one or more examples, the one or more data constructs of the platform authorization information store 116 are stored in one or more storage devices of any type configured to function as a data repository.

In one or more examples, the private cloud platform 104 includes the platform event transmitter 114. In one or more examples, the platform event transmitter 114 is any hardware, or combination of hardware and software, that is configured to be aware of any identity event occurring within the private cloud platform 104, and to transmit all or any portion of such identity events to an event manager (e.g., the event manager 120, discussed below) of an SSO broker (e.g., the SSO broker 118, discussed below). In one or more examples, an identity event is any event that represents a change to any users, roles, workspaces, and the like of the private cloud platform 104. Examples of identity events include, but are not limited to, adding a new user, deleting a user, making a change related to a user, adding, removing, and/or changing a role (e.g., collectively, making a role modification), adding or removing a user from a workspace, adding a workspace, removing a workspace, changing a workspace, and the like. In one or more examples, the platform event transmitter 114 is configured to transmit at least some information about an identity event to the event manager 120 (discussed below) of the SSO broker 118 (discussed below) as a notification any time an identity event occurs. The notification may, as an example, include a limited amount of information, such as an identity of a user and/or workspace(s) to which the identity event corresponds.

In one or more examples, the private cloud platform 104 is configured to provide an interface through which authenticated users of the private cloud 100 may interact with the resources of the private cloud 100 for which they are authorized. Resources of the private cloud 100 may include the private cloud resources 136. In one or more examples, the private cloud resources 136 are any computing resources (e.g., computing devices, network devices, management devices, and the like) and/or services implemented on such computing resources (e.g., storage services, file services, network services, management services, monitoring services, and the like) that are deployed within the private cloud 100. Resources of the private cloud 100 may additionally or alternatively include the other applications 128, which is shown in FIG. 1 as including the application A 130, the application B 132, and the application N 134. As indicated by the three dots shown in FIG. 1 between the application B 132 and the application N 134, the other applications 128 may include any number of applications without departing from the scope of examples disclosed herein. In one or more examples, the other applications 128 may be any one or more applications, which may be used for any purpose, and which may be provided by the provider of the private cloud 100, or by any third-party, to be used by users of the private cloud 100.

As an example, a user may authenticate via the entity identity provider 102, and access a web-based UI of the private cloud platform 104, where the user may see links to the various resources of the private cloud 100 (e.g., the aforementioned private cloud resources 136 and/or the other applications 128) that the user is authorized to access, such as configuring and/or accessing a virtual machine via a VMaaS service, configuring and/or accessing physical computing resources via a BMaaS service, and/or accessing one or more applications (e.g., 130, 132, 134) deployed in the private cloud that are provided by a private cloud provider or any third-party application provider. In one or more examples, access to such resources may be facilitated, at least in part, via the SSO broker 118.

In one or more examples, the SSO broker 118 of the private cloud 100 is a computing device (discussed above) configured to facilitate access for users of the private cloud (including, but not limited to, human users, software entities, and the like) to the various computing resources of the private cloud 100. In one or more examples, the private cloud platform 104 is configured to be interacted with by other applications, devices, components, and the like of the private cloud 100 via private cloud platform-specific application programming interfaces (APIs). However, all or any portion of the computing resources of the private cloud 100 may not be configured to use such APIs.

As an example, many resources and/or applications of the private cloud 100 (e.g., the other applications 128, services within the private cloud resources 136) are configured with constructs similar to the above-described tenants and workspaces that control which users are allowed to access and use the application and/or resources, and what features and/or functionality of the application and/or resource a given user is allowed to use. Such applications may, for example, be configured with certain identity techniques and protocols (e.g., SAML) that must be used to access and use the applications and/or resources, which may be different than the APIs of the private cloud platform 104. Accordingly, the SSO broker 118 may be deployed in the private cloud 100 to function, at least in part, as a bridge between the private cloud platform 104 and the various private cloud resources 136 and other applications 128 of the private cloud 100.

In one or more examples, the SSO broker 118 includes the IAM tool 122. The IAM tool may be a computing device (discussed above) configured to implement identity and access management within the private cloud 100. One example of the IAM tool 122 is Keycloak. Other IAM tools may be used as the IAM tool 122 without departing from the scope of examples disclosed herein. In one or more examples, the IAM tool 122 is configured to trust the platform identity provider 106 of the private cloud platform 104. As such, in one or more examples, the IAM tool 122 may be configured with constructs that mirror those of the platform identity provider. In one or more examples, the IAM tool 122 is configured with any number of realms (e.g., the realm 124, the realm 126). Although FIG. 1 shows the IAM tool as having two realms configured, the IAM tool may include any number of realms without departing from the scope of examples disclosed herein.

In one or more examples, a realm (e.g., 124, 126) is a construct within the IAM tool 122 that mirrors a workspace of the platform identity provider 106 of the private cloud platform 104. As such, a realm, like a workspace, may be a bounded context of computing resources, applications, and the like within which an authenticated user is authorized to operate. In one or more examples, users assigned to a particular workspace (e.g., 110, 112) may thus be assigned to a corresponding realm (e.g., 124, 126) of the IAM tool 122.

The IAM tool 122 may also be configured with constructs, referred to herein as groups, that correspond to the role constructs of the platform identity provider 106. Thus, a user that is assigned to a particular role within the platform identity provider 106 may be assigned to a corresponding group within the IAM tool 122, and any role modification made within an entity identity provider and/or platform identity provider will cause a notification to the SSO broker 118 that triggers a corresponding group modification in the IAM tool 122.

In one or more examples, a realm (e.g., 124, 126) may be configured with one or more application identity management instances (not shown), each of which may correspond to an application (e.g., 130, 132, 134) of the other applications 128. As an example, a realm (e.g., realm A 124) may include a SAML application instance corresponding to the application A 130. In one or more examples, an application identity management instance in a realm is configured to provide a user of the realm with access to the corresponding application. As an example, a user may authenticate via the entity identity provider 102, and access a web-based UI of the private cloud platform 104 based on the authentication being provided to the platform identity provider 106, which is configured to trust the entity identity provider 102. In the web-based UI, the user may see links to the various resources of the private cloud 100 (e.g., the aforementioned private cloud resources 136 and/or the other applications 128) that the user is authorized to access, such as configuring and/or accessing a virtual machine via a VMaaS service, configuring or accessing physical computing resources via a BMaaS service, and/or accessing one or more applications (e.g., 130, 132, 134) deployed in the private cloud that are provided by a private cloud provider or any third-party application provider. When the user selects an application, service, or resource, authentication information corresponding to the user (e.g., a token) may be provided to the IAM tool 122, which is configured to trust authenticated users from the platform identity provider 106. In the case where the user selected one of the other applications 128, the IAM tool 122 may provide the authentication information to an application identity management instance within a realm for which the user is authorized, and that corresponds to the application the user is seeking to access. In one or more examples, an application identity management instance may provide the authentication information to the corresponding application, which may be configured to trust the IAM tool, and, thus, authorize the user to use the application, or any portion thereof.

In one or more examples, the SSO broker 118 includes the event manager 120. In one or more examples, the event manager 120 is any hardware, or software executing on any hardware, that is configured to receive identity events from the private cloud platform 104, parse the identity events to obtain information therein, use such information to obtain additional information about the identity event, and use the additional information to cause the IAM tool 122 to make any modifications to the realms (e.g., 124, 126) based on the changes that triggered the identity event. The event manager 120 of the SSO broker is discussed in greater detail in the description of FIG. 2, below.

While FIG. 1 shows a particular configuration of devices and/or components, other configurations may be used without departing from the scope of examples described herein. Accordingly, examples disclosed herein should not be limited to the configuration of devices and/or components shown in FIG. 1.

Figure 2:
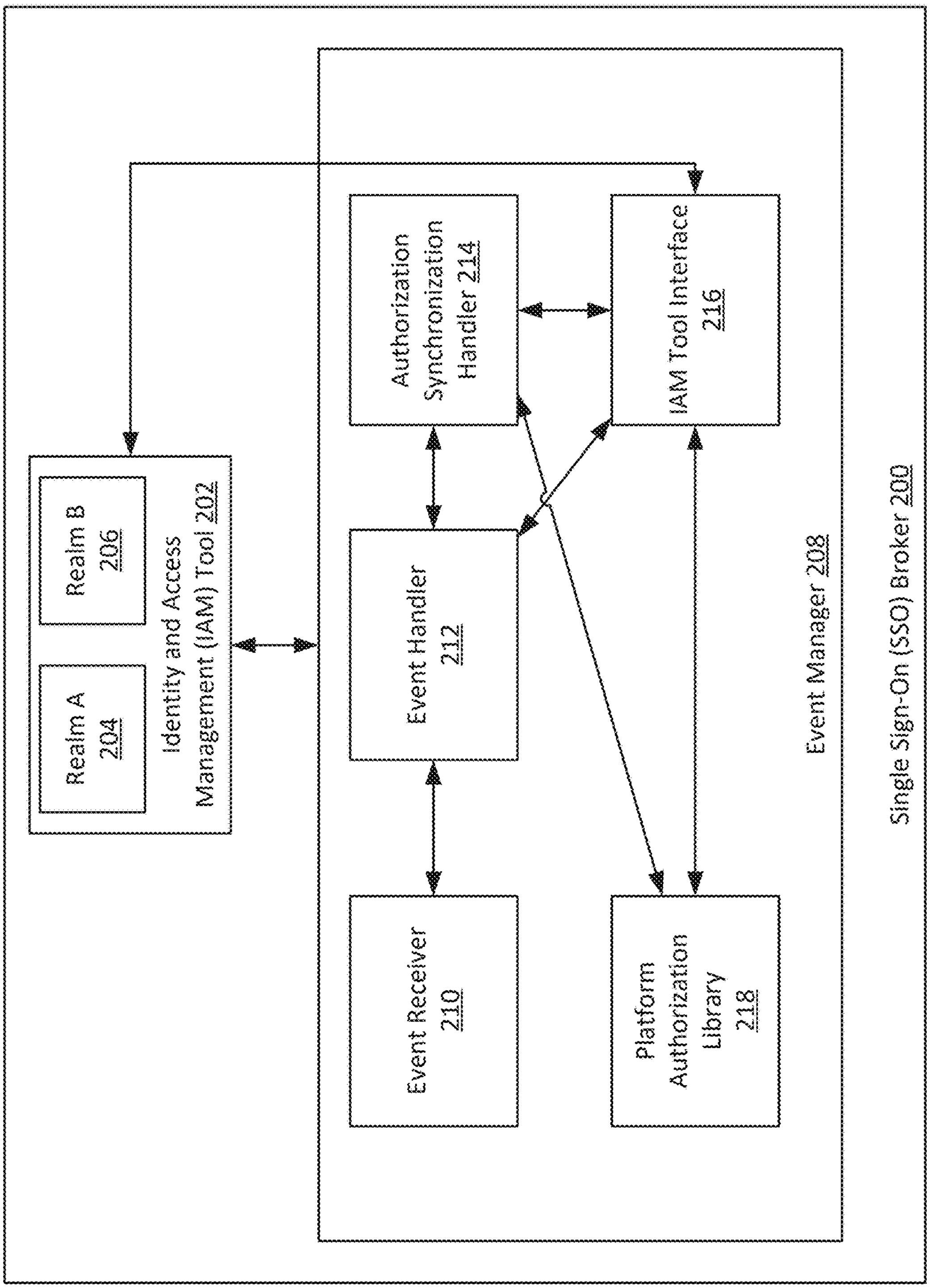
FIG. 2 is a block diagram of an single sign-on (SSO) broker, in accordance with one or more examples disclosed herein.

FIG. 2 is a block diagram of an SSO broker 200, in accordance with one or more examples disclosed herein. As shown in FIG. 2, the SSO broker 200 includes an IAM tool 202 and an event manager 208. In one or more examples, the IAM tool 202 includes realm A 204 and realm B 206. In one or more examples, the event manager 208 includes an event receiver 210, an event handler 212, an authorization synchronization handler 214, an IAM tool interface 216, and a platform authorization library 218. Each of these components is described below.

In one or more examples, the SSO broker 200 is the same as or substantially similar to the SSO broker 118 shown in FIG. 1 and discussed above. In one or more examples, the IAM tool 202 is the same as or substantially similar to the IAM tool 122 shown in FIG. 1 and discussed above. In one or more examples, the realm A 204 and the realm B 206 are the same or substantially similar to the realms 124 and 126 shown in FIG. 1 and discussed above.

In one or more examples, the event manager 208 is an example of the event manager 120 shown in FIG. 1 and discussed above. As such, the event manager 208 is part of an SSO broker (e.g., the SSO broker 200) and operatively connected to the IAM tool 202 of the SSO broker 200. Although not shown in FIG. 1, the event manager 208 may also be operatively connected to a private cloud platform (e.g., the private cloud platform 104 shown in FIG. 1 and discussed above), and more specifically, to a platform event transmitter (e.g., the platform event transmitter 114 shown in FIG. 1 and discussed above) and a platform authorization information store (e.g., the platform authorization information store 116 shown in FIG. 1 and discussed above) of a private cloud platform.

In one or more examples, the event manager 208 includes the event receiver 210. In one or more examples, the event receiver 210 may be any hardware (e.g., one or more processors), or software executing on hardware (e.g., one or more processors) that is configured to receive notifications of identity events (discussed above) from a platform event transmitter (e.g., the platform event transmitter 114 of FIG. 1) of a private cloud platform (e.g., the private cloud platform 104 of FIG. 1). In one or more examples, the event receiver 210 is configured to receive a notification of an identity event each time an identity event occurs within the private cloud platform. In one or more examples, the notification of the identity event includes a limited amount of information, such as an identification of one or more users and/or one or more workspaces to which the identity event corresponds.

In one or more examples, the event manager 208 includes the event handler 212. In one or more examples, the event handler 212 is configured to subscribe to receive notifications of events of particular types, including identity events. In one or more examples, based on such a subscription, the event handler 212 may receive notifications of identity events from the event receiver 210, and parse such notifications to obtain information included therein, such as identification of a user and/or workspace to which the notification corresponds. In one or more examples, based on such information, the event handler 212 may provide the information extracted from the notification to the IAM tool interface 216, and/or to the authorization synchronization handler 214.

In one or more examples, when the identity event is the addition or deletion of a user, the identity event may be considered an authentication event, and information related thereto may be provided to the IAM tool interface 216 of the event manager 208. In such a case, the IAM tool interface 216 may be configured to interact with the IAM tool 202 to add the user to or remove the user from one or more realms (e.g., 204, 206) if the IAM tool.

In one or more examples, when the identity event is related to authorization of a user to access resources of a private cloud, to create or remove a workspace, or to create, remove, or modify a role (e.g., a role modification), the event handler 212 may provide the information extracted from the notification of the identity event to the authorization synchronization handler 214.

In one or more examples, the authorization synchronization handler 214 may then generate a request to a platform authorization library 218 to fetch information from a platform authorization information store (e.g., the platform authorization information store 116 of FIG. 1) of a private cloud platform (e.g., the private cloud platform 104 of FIG. 1). In one or more examples, the platform authorization library 218 is a library of resources (e.g., code, functions, scripts, and the like) configured to interact with, at least, one or more APIs of a private cloud platform (e.g., the private cloud platform 104 of FIG. 1). In one or more examples, the platform authorization library 218 is configured to interact with the private cloud platform via an API to obtain information related to the authorization type identity event, and to provide such information to the authorization synchronization handler 214 and/or the IAM tool interface 216.

As an example, when an identity event relates to a change in the resources of a private cloud that a user is permitted to access, the authorization synchronization handler 214 may use the platform authorization library 218 to obtain the user access rights from the platform authorization information store of the private cloud platform, which will include whatever change was made to such user access rights. In one or more examples, the IAM tool interface 216 may then be invoked to interact with the IAM tool 202 to update one or more realms (e.g., 204, 206) to properly reflect the changes.

While FIG. 2 shows a particular configuration of devices and/or components, other configurations may be used without departing from the scope of examples described herein. Accordingly, examples disclosed herein should not be limited to the configuration of devices and/or components shown in FIG. 2.

Figure 3:
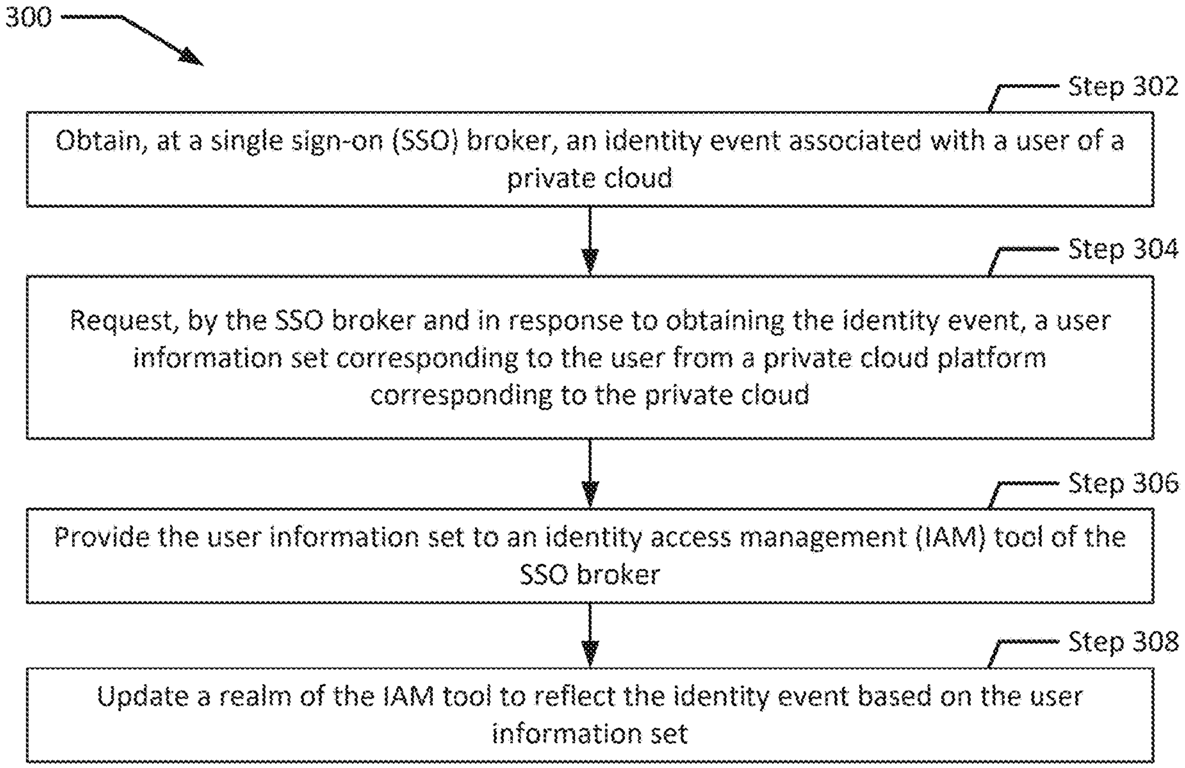
FIG. 3 illustrates an overview of an example method for managing identity events via an SSO broker of a private cloud environment, in accordance with one or more examples disclosed herein.

FIG. 3 illustrates an overview of an example method for managing identity events via an SSO broker of a private cloud environment, in accordance with one or more examples disclosed herein.

The method 300 may be performed, at least in part, by one or more devices and/or components of a private cloud (e.g., the private cloud 100 of FIG. 1). As such, all or any portion of the method 300 may be performed, for example, by an SSO broker (e.g., the SSO broker 118 of FIG. 1, the SSO broker 200 of FIG. 2).

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3 and/or steps not shown in FIG. 3.

In Step 302, the method 300 includes obtaining, at an SSO broker (e.g., the SSO broker 118 of FIG. 1, the SSO broker 200 of FIG. 2), an identity event associated with a user of a private cloud (e.g., the private cloud 100 of FIG. 1). In one or more examples, an identity event may occur anytime a change of any type is made related to a user, role, or workspace of a private cloud platform (e.g., the private cloud platform 104 of FIG. 1). Such a change may be made, for example, by an administrator of a private cloud platform (e.g., the private cloud platform 104 of FIG. 1), or by an administrator of an entity identity provider (e.g., entity identity provider 102). Examples of identity events include, but are not limited to, adding a new user, deleting a user, a change related to a user, adding, removing, and/or changing a role (e.g., a role modification), adding or removing a user from a workspace, adding a workspace, removing a workspace, changing a workspace, and the like. An identity event may be triggered, for example, by an administrator interacting with an entity identity provider (e.g., the entity identity provider 102 of FIG. 1) and/or a platform identity provider (e.g., the platform identity provider 106 of FIG. 1). In one or more examples, the SSO broker obtains the identity event via an event receiver (e.g., the event receiver 210 of FIG. 2), and may parse the identity event via an event handler (e.g., the event handler 212 of FIG. 2) to obtain information related to the identity event, such as, for example, identification of one or more users, roles, and/or workspaces to which the identity event corresponds.

In Step 304, the method 300 includes requesting, by the SSO broker (e.g., the SSO broker 118 of FIG. 1, the SSO broker 200 of FIG. 2) and in response to obtaining the identity event, a user information set corresponding to the user from a private cloud platform corresponding to the private cloud. In one or more examples, a user information set is any set of information related to a user of a private cloud platform (e.g., the private cloud platform 104 of FIG. 1). Such a user information set may include, for example, user access rights, which indicate what resources within a private cloud (e.g., the private cloud 100 of FIG. 1) that a user has rights to access and/or otherwise use. In one or more examples, a user information set includes, but is not limited to, information related to workspaces, roles, applications, and the like associated with a user, and the portions of such resources that a particular user is authorized to access and/or otherwise use. In one or more examples, a user information set may include information related to one user, or any number of users. In one or more examples, a user information set may include information about roles, or workspaces, including information about what users are authorized to access the same. As an example, when a new workspace is added, a user information set may include information about the set of users associated with the new workspace.

In one or more examples, the SSO broker requests the user information set based on information obtained about the identity event obtained in Step 302. In one or more examples, the SSO broker obtains the user information set using a platform authorization library (e.g., the platform authorization library 218 of FIG. 2). As an example, the platform authorization library may be provided with at least a portion of the information obtained from a notification of an identity event, and use such information to form a request to be sent to a private cloud platform for corresponding information from a platform authorization information store (e.g., the platform authorization information store 116 of FIG. 1). In one or more examples, the platform authorization library is configured to communicate with the private cloud platform to request the user information set using one or more APIs specific to the private cloud platform. In one or more examples, the private cloud platform responds to such a request by providing the user information set, including corresponding user access rights, information about changes to one or more workspaces, and/or information about changes to one or more roles to the SSO broker.

In Step 306, the method 300 includes providing the user information set to an identity access management (IAM) tool (e.g., the IAM tool 122 of FIG. 1, the IAM tool 202 of FIG. 2) of the SSO broker (e.g., the SSO broker 118 of FIG. 1, the SSO broker 200 of FIG. 2). In one or more examples, all or any portion of the user information set is provided to the IAM tool from an event manager (e.g., the event manager 208 of FIG. 2) of the SSO broker to the IAM tool. In one or more examples, the event manager of the SSO broker provides the user information set to the IAM tool using an IAM tool interface (e.g., the IAM tool interface 216 of FIG. 2), which may be configured to communicate the user information set to the IAM tool.

In Step 308, the method 300 includes updating a realm (e.g., the realms 204, 206 of FIG. 2) of the IAM tool (e.g., the IAM tool 202 of FIG. 1) to reflect the identity event based on the user information set. In one or more examples, the realms of the IAM tool correspond to the workspaces of the private cloud platform and/or tenants of an entity identity provider. In one or more examples, one or more realms of the IAM tool are updated to reflect the information in the user information set based on the identity event, and the change(s) that caused the identity event. As an example, when a user is added or removed to a workspace, a realm may be updated to include or remove the user. As another example, when a user is given authorization to access a particular application (e.g., one or the other applications 128 of FIG. 1), a realm may be updated to reflect the user's new access rights for the application. As another example, if a new workspace is created, a new realm may be created in the IAM tool to mirror the new workspace. As another example, if a role is modified, added, or deleted (e.g., a role modification occurs), a corresponding group within a realm of the IAM tool is modified, added, or deleted (e.g., a corresponding group modification is made). In one or more examples, when the identity event includes providing a user with authorization to access and/or otherwise use an application within a private cloud, an update to the realm may include updating an application identity management instance within the realm that corresponds to the application with authorization information for the user.

In one or more examples, although not shown in FIG. 3, once a realm of an IAM tool of the SSO broker has been updated, a user may authenticate via a single sign-on process with an entity identity provider, the authentication may be provided to a private cloud platform when the user accesses the private cloud platform, and the user may be able to access resources of the private cloud, including services and applications therein, which may be facilitated, at least in part, by the SSO broker, and thus the IAM tool, being provided information (e.g., a token) related to the authenticated user, which may be used to authorize the user to access and/or otherwise use resources configured within a realm of the IAM tool.

FIG. 4 illustrates a block diagram of a computing device 400, in accordance with one or more examples disclosed herein. The computing device 400 may be an example of the various computing devices (e.g., the private cloud platform 104 of FIG. 1, the entity identity provider 102 of FIG. 1, the SSO broker 118 of FIG. 1, the SSO broker 200 of FIG. 2) described above and/or of the computing device 500, described below. As discussed above in the descriptions of FIG. 1, FIG. 2, and FIG. 3, the computing device 400 may be used to implement all or any portion of the various components shown in FIG. 1 and/or FIG. 2 and described above and/or to perform all or any portion of the method 300 shown in FIG. 3 and described above.

The computing device 400 may include one or more processors 402 and memory 404. The memory 404 may include a non-transitory computer-readable medium that stores programming for execution by one or more of the one or more processors 402. In this implementation, one or more modules within the computing device 400 may be partially or wholly embodied as software for performing any functionality described in this disclosure. The computing device 400 may be, for example, configured to perform the method 300 shown in FIG. 3 and described above, by executing instructions included in the memory 404 and executed by the one or more processors 402.

For example, the memory 404 may include instructions 406 to obtain, at a single sign-on (SSO) broker, an identity event associated with a user of a private cloud (e.g., as described above in reference to Step 302 of FIG. 3).

For example, the memory 404 may include instructions 408 to request, by the SSO broker and in response to obtaining the identity event, a user information set corresponding to the user from a private cloud platform corresponding to the private cloud (e.g., as described above in reference to Step 304 of FIG. 3).

For example, the memory 404 may include instructions 410 to provide the user information set to an identity access management (IAM) tool of the SSO broker (e.g., as described above in reference to Step 306 of FIG. 3).

For example, the memory 404 may include instructions 412 to update a realm of the IAM tool to reflect the identity event based on the user information set (e.g., as described above in reference to Step 308 of FIG. 3).

FIG. 5 illustrates a block diagram of a computing device, in accordance with one or more examples of this disclosure. As discussed above, examples described herein may be implemented, at least in part, using computing devices, and the computing device 500 shown in FIG. 5 may be such a computing device. For example, all or any portion of the components shown in FIG. 1 (e.g., the entity identity provider 102, the private cloud platform 104, the SSO broker 118) and/or FIG. 2 (e.g., SSO broker 200, the IAM tool 202) may be implemented, at least in part using a computing device such as the computing device 500, and may include all or any portion of the components of the computing device 500 shown in FIG. 5 and described below.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. In some examples, a computing device (e.g., the computing device 500) may include any number of heterogeneous processors.

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be a central processing unit (CPU), a multi-core CPU, an application specific integrated circuit (ASIC), a graphics processing unit (GPU), a data processing unit (DPU), a tensor processing units (TPU), an associative processing unit (APU), a vision processing units (VPU), a quantum processing unit (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, a network device, or a processing device to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operative connection, and variations thereof, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

obtain, at a single sign-on (SSO) broker, an identity event associated with a user of a private cloud;

request, by the SSO broker and in response to obtaining the identity event, a user information set corresponding to the user from a private cloud platform corresponding to the private cloud;

provide the user information set to an identity access management (IAM) tool of the SSO broker; and update a realm of the IAM tool to reflect the identity event based on the user information set:

authenticate, when the user performs an SSO action via the private cloud platform, an identity of the user; and authorize, after the authentication, the user to access services and applications configured within the realm of the IAM tool of the SSO broker.

2. The system of claim 1, wherein the realm of the IAM tool is configured to correspond to a workspace of the private cloud platform.

3. The system of claim 2, wherein the workspace of the private cloud platform corresponds to a tenant of an entity identity provider.

4. The system of claim 1, wherein:

the identity event comprises a role modification for a role associated with the user, the realm of the IAM tool is configured with a group corresponding to the role, and, to update the realm of the IAM tool, the instructions, when executed by the one or more processors, further cause the one or more processors to:

make a group modification to the group that corresponds to the role modification.

5. The system of claim 1, wherein:

the realm of the IAM tool is configured with an application identity management instance corresponding to an application deployed within the private cloud, and the identity event comprises a grant of access for the user, in the private cloud, to the application corresponding to the application identity management instance of the realm.

6. The system of claim 1, wherein to request, by the SSO broker, the user information set, the instructions further cause the one or more processors to interact, via the SSO broker, with the private cloud platform by an application programing interface (API) provided by the private cloud platform.

7. A computer-implemented method, comprising:

obtaining, at a single sign-on (SSO) broker, an identity event associated with a user of a private cloud;

requesting, by the SSO broker and in response to obtaining the identity event, a user information set corresponding to the user from a private cloud platform corresponding to the private cloud;

providing the user information set to an identity access management (IAM) tool of the SSO broker; and updating a realm of the IAM tool to reflect the identity event based on the user information set:

authenticating, when the user performs an SSO action via the private cloud platform, an identity of the user; and authorizing, after the authentication, the user to access services and applications configured within the realm of the IAM tool of the SSO broker.

8. The computer-implemented method of claim 7, wherein the realm of the IAM tool is configured to correspond to a workspace of the private cloud platform.

9. The computer-implemented method of claim 8, wherein the workspace of the private cloud platform corresponds to a tenant of an entity identity provider.

10. The computer-implemented method of claim 7, wherein:

the identity event comprises a role modification for a role associated with the user, the realm of the IAM tool is configured with a group corresponding to the role, and updating the realm of the IAM tool to reflect the identity event based on the user information set comprises:

making a group modification to the group that corresponds to the role modification.

11. The computer-implemented method of claim 7, wherein:

the realm of the IAM tool is configured with an application identity management instance corresponding to an application deployed within the private cloud, and the identity event comprises a grant of access for the user, in the private cloud, to the application corresponding to the application identity management instance of the realm.

12. The computer-implemented method of claim 7, wherein requesting, by the SSO broker, the user information set comprises interacting, by the SSO broker, with the private cloud platform by an application programing interface (API) provided by the private cloud platform.

13. A non-transitory computer-readable medium storing programming for execution by one or more processors, the programming comprising instructions to:

obtain, at a single sign-on (SSO) broker, an identity event associated with a user of a private cloud;

request, by the SSO broker and in response to obtaining the identity event, a user information set corresponding to the user from a private cloud platform corresponding to the private cloud;

provide the user information set to an identity access management (IAM) tool of the SSO broker; and update a realm of the IAM tool to reflect the identity event based on the user information set;

authenticate, when the user performs an SSO action via the private cloud platform, an identity of the user; and authorize, after the authentication, the user to access services and applications configured within the realm of the IAM tool of the SSO broker.

14. The non-transitory computer-readable medium of claim 13, wherein:

the realm of the IAM tool is configured to correspond to a workspace of the private cloud platform, and the workspace of the private cloud platform corresponds to a tenant of an entity identity provider.

15. The non-transitory computer-readable medium of claim 13, wherein:

the identity event comprises a role modification for a role associated with the user, the realm of the IAM tool is configured with a group corresponding to the role, and, to update the realm of the IAM tool, the programming comprises further instructions to:

make a group modification to the group that corresponds to the role modification.

16. The non-transitory computer-readable medium of claim 13, wherein:

the realm of the IAM tool is configured with an application identity management instance corresponding to an application deployed within the private cloud, and the identity event comprises a grant of access for the user, in the private cloud, to the application corresponding to the application identity management instance of the realm.

17. The non-transitory computer-readable medium of claim 13, wherein to request, by the SSO broker, the user information set, the programming comprises further instructions to interact, by the SSO broker, with the private cloud platform by an application programing interface (API) provided by the private cloud platform.

* * * * *